United States Patent

Johnson

[15] 3,680,199

[45] Aug. 1, 1972

[54] ALLOYING METHOD

[72] Inventor: Clair A. Johnson, Sherman, Tex.

[73] Assignee: Texas Instruments Incorporated, Dallas, Tex.

[22] Filed: July 6, 1970

[21] Appl. No.: 56,145

Related U.S. Application Data

[63] Continuation of Ser. No. 612,424, Jan. 30, 1967, abandoned.

[52] U.S. Cl. ....................................29/498, 29/589

[51] Int. Cl. ........................B23k 31/02, B23k 35/24

[58] Field of Search.....29/472.9, 498, 504, 589, 494, 29/590; 317/234

[56] References Cited

UNITED STATES PATENTS

| | | | |
|---|---|---|---|
| 3,071,852 | 1/1963 | Rogers | 29/494 X |
| 3,091,849 | 6/1963 | Cohen | 29/494 X |
| 3,136,032 | 6/1964 | Berndsen | 29/498 X |
| 3,200,490 | 8/1965 | Clymer | 29/590 |
| 3,205,572 | 9/1965 | Jochems | 29/498 X |
| 3,298,093 | 1/1967 | Cohen | 29/504 X |
| 3,316,628 | 5/1967 | Long, Jr. | 29/590 X |
| 3,409,977 | 11/1968 | Johnson | 29/494 |
| 3,432,913 | 3/1969 | Bronnes et al. | 29/590 X |
| 3,234,643 | 2/1966 | Hollander | 29/487 X |

*Primary Examiner*—John F. Campbell
*Assistant Examiner*—Ronald J. Shore
*Attorney*—Samuel M. Mims, Jr., James O. Dixon, Andrew M. Hassell, Harold Levine and Gerald B. Epstein

[57] ABSTRACT

This application discloses a method of joining two materials together by alloying wherein only a portion of one of the materials is heated to a temperature less than its melting point but greater than the eutectic temperature of the two materials. After the portion of the material has been so heated, the second material is brought into contact with the heated portion. A cooling medium may be passed over the materials alloyed to aid in the cooling of the alloy junction. A preferred embodiment of the invention is disclosed wherein a semiconductor material or chip is alloyed to a support member by rapidly heating the area of the support to which the chip is to be alloyed to an alloying temperature which is above the eutectic temperature and below the melting point of the support, preheating the surface of the chip to be alloyed to the support, bringing the areas to be alloyed into contact with a following pressure to cause essentially instant melting and alloying of the contacted surfaces, and cooling the alloyed areas immediately following contact. The heating and cooling may be accomplished by any suitable means, but a hot or cold gas stream is preferred.

5 Claims, 4 Drawing Figures

PATENTED AUG 1 1972 3,680,199

Figure 1:
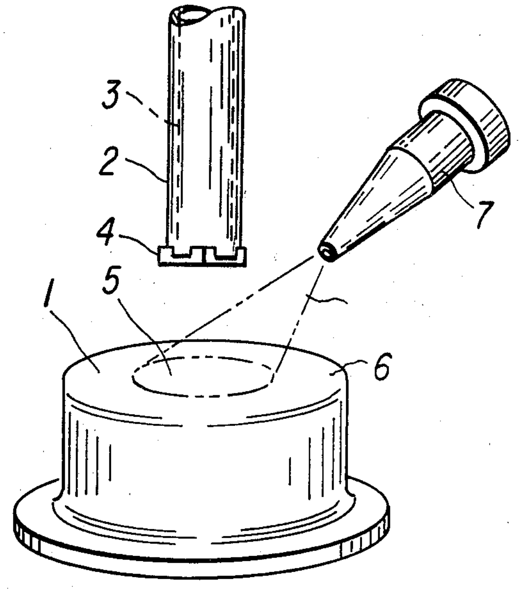

INVENTOR
Clair A. Johnson

BY Robert J. Crawford
ATTORNEY

ALLOYING METHOD

This application is a continuation of copending application Ser. No. 612,474, filed Jan. 30, 1967, now abandoned.

The present invention relates to a method of joining two materials by alloying, and more particularly relates to a method of alloying a semiconductor chip to a support.

There are a number of conventional processes for mounting a semiconductor chip or die to a header or support member by forming an alloy of the semiconductor material and a plating or preform on the support. To bring the support member and semiconductor chip to the alloying temperature two basic methods are often used. The first method, sometimes referred to as the hand alloy, method consists of placing a cold or slightly preheated semiconductor chip onto a preheated support member with tweezers or a vacuum pickup, and oscillating or scrubbing the chip against the support member to effect heat transfer from the support member to the chip and assist in wetting the interface area with eutectic melt. Some of the mechanisms of hand alloying may be carried out by automatic machinery or by hand, but in either case the basic problems of hand alloying remain. For example, cycle time of the alloying process is excessively long due to the required scrubbing time; scrubbing tends to damage the chip and prevents accurate location on the support member; and since most headers have glass to metal seals, the rate of preheat in degrees centigrade per second determines the specific number of preheat stations that must be provided for a particular machine rate, i.e., the number of preheat stations is equal to the total temperature rise of the header divided by the product of the alloy cycle time in seconds and the allowable temperature rise per second.

A second alloying method is the furnace alloy method. A group of headers having chips thereon are placed in a boat such as graphite, and passed through a furnace. The furnace is provided with gaseous atmosphere such as hydrogen. As in the case of hand alloying, furnace alloying creates many problems such as, for example: an excessively long alloy cycle time and an excessive handling; some semiconductor devices can not be furnace alloyed due to sensitivity to temperature; equipment is often large and cumbersome and is not well adapted to small volumes or intermittent production; temperature control along the length of the furnace is critical and very difficult to achieve; and the location of the chip on the header is difficult to maintain during alloying.

Applicant has devised a method of alloying semiconductor chips to supports which avoids many of the foregoing disadvantages. In carrying out the method, only a small portion of the support to which the chip is to be alloyed is rapidly heated to a temperature in excess of the eutectic temperature of the chip and the portion of the support, but less than the melting temperature of the heated portion of the support. Preferably, the portion of the support which is heated above the eutectic temperature is only slightly larger than the surface area of the chip to be alloyed to the support. Rapidly heating only a small portion of the support is advantageous since this greatly facilitates external cooling of the melt immediately after its formation. In addition, the unheated portion of the support acts as a heat sink and actually aids in cooling of the alloyed portions without external cooling. After the surface of the support to be alloyed to the chip is brought to the alloying temperature, and the surface of the chip to be alloyed has been preheated if desired, the surfaces are brought into intimate contact to create a melt and a following pressure is applied to prevent the formation of voids. At approximately the time the surfaces are brought into contact the heat source is removed and preferably a cooling medium is caused to flow over the chip and support to aid in rapid cooling of the alloyed junction. Such cooling is desirable to prevent the semiconductor chip from absorbing heat from the alloyed junction or support which may damage the semiconductor properties of the chip. By utilizing such a method, the alloyed junction is formed almost instantaneous on contact of the parts to be alloyed, without splattering or formation of excessive melt. The alloy formed typified by a narrow "picture frame" of melt with rounded corners as contrasted to a large, irregularly shaped alloy melt produced by conventional processes.

Although the novel process is particularly adapted to use in alloying semiconductor chips to supports, it is applicable to the alloying of other materials and devices where the eutectic temperature of the materials to be alloyed is less than the melting point of such materials.

It is therefore an object of this invention to provide a novel process of alloying materials.

It is a further object to provide a method of alloying a semiconductor chip to a support.

It is an additional object of the invention to provide a process for alloying a semiconductor chip to a support by bringing the portion of the support to be alloyed to the chip to a temperature above the eutectic of the portion to be alloyed but below the melting point of the support prior to bringing the support and chip into contact.

It is yet another object of the invention to provide a novel method of alloying a semiconductor chip to a metal support member including the steps of heating that portion support member to be alloyed to the chip to a temperature in excess of the eutectic but less than the melting point of the support by impinging a hot gas stream on the portion to be heated, passing the surface of the chip to be alloyed to the heated area of the support through the hot gas stream to preheat the chip surface, and bringing the support and the chip into intimate contact with a following pressure to form an alloy junction, and cooling the alloy junction. The features of the present invention which are believed to be novel are set forth with particularity in the appended claims. The organization and manner of operation of the invention, together with further objects and advantages thereof, may best be understood by reference to the following description taken in connection with the accompanying drawing in which like reference numerals in the several figures identify like elements and in which:

FIGS. 1 through 4 are pictorial views of successive stages of making an alloy junction by a preferred embodiment of this invention.

Referring to FIG. 1, a header or support member to which a semiconductor chip is to be alloyed is shown at 1. The support member may be a conventional solid metallic slug or it may be a conventional precious metal plated material such as Kovar or ceramic plated with gold. A pickup device such as a vacuum pencil is shown at 2, having a central hollow portion 3 in which a vacuum is created to hold a semiconductor chip 4 as shown. The hollow portion 3 may also be used to inject a cooling gas as will be later described. A hollow nozzle 7 is shown so arranged that it may be utilized to supply a hot gas stream 6 to heat that portion of the header which is to be alloyed to the chip. The heat medium 6 may be any other suitable medium such as a beam of radiant energy.

Figure 2:
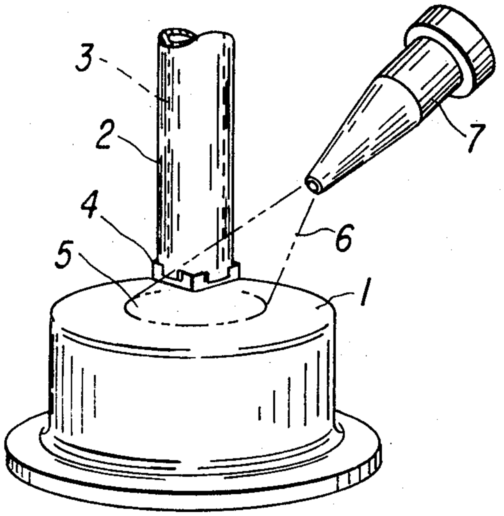
Figure 3:
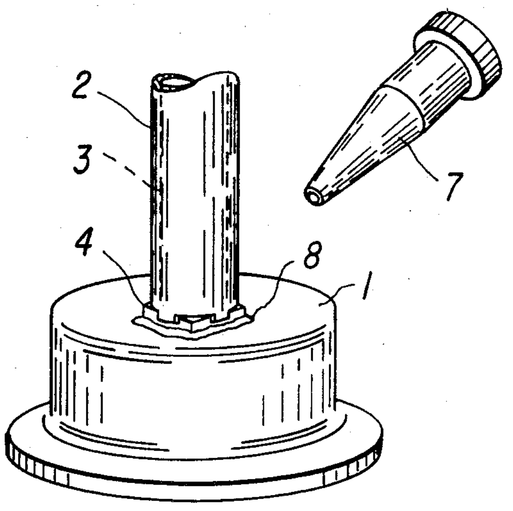
Figure 4:
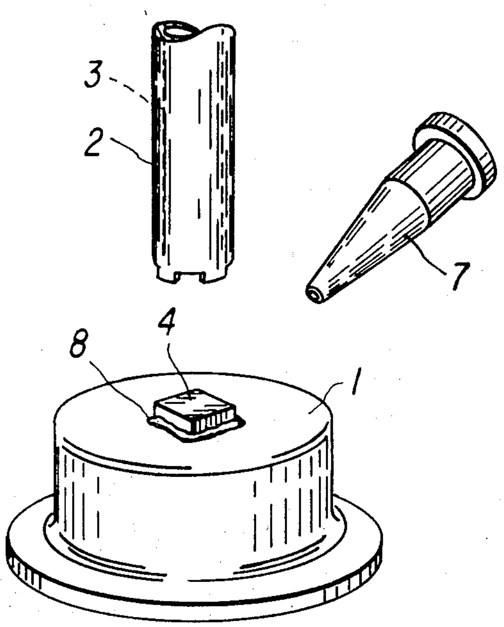

In carrying out the process, the parts are first arranged as shown in FIG. 1 with the gas stream 6 preheating the portion 5 of the support member 1 to which the chip is to be alloyed. After preheating the portion 5, the pencil 2 is moved as shown in FIG. 2 such that the gas stream heats the bottom surface of the chip 4. Immediately after the portion 5 has reached the alloying temperature, pickup 2 is lowered so that the device 4 is brought through the heat medium 6 and into contact with the area 5 of support member 1 as shown in FIG. 2. Immediately following contact, the gas stream is shut off as shown in FIG. 3, and if desired, the vacuum in pickup 2 is turned off and a cooling fluid is flooded around the chip and support through the pickup 2 to aid in cooling of the alloy junction. Referring to FIG. 4, it is seen that the pickup 2 has been withdrawn and the support 1 and device 4 have been joined by an alloy junction 8.

It is to be understood that the mechanical manipulation of the pickup 2 and nozzle 5 are not a part of this invention. Any conventional means may be used for regulating the gas stream 7 such as, for example, a valve for turning the stream on and off, a shutter for opening and closing the end of the nozzle, or some means for simply moving the nozzle away from the areas which are to be alloyed. Similarly, the means used to regulate the vacuum in the pickup 2 and switch to a cooling gas which is passed through the opening 3 are immaterial to this invention, as are the means by which the pickup is advanced and retracted. Any conventional automatic or manual arrangement is satisfactory. Further, an additional nozzle may be utilized to supply the cooling gas, or alternatively the cooling fluid could be passed through the nozzle 5 after the heating gas is turned off. It should also be understood that while a gas heating jet and a gas cooling jet have been shown as the preferred means for heating the devices to be alloyed and for cooling the alloyed junctions, respectively, other means for heating and cooling may equally be applicable to the method of this invention. For example, the heating may be accomplished by radiant energy from a laser beam or an infrared source.

As previously noted, the header or support 1 may be a solid metallic substance, or it may be a composite material such as a ceramic or ferrous material plated with a precious metal such as, for example, gold, such headers or supports being common place in the prior art. The portion 9 of the support 1 which is treated above the eutectic temperature should be small as compared to the total mass of the support. For example, the mass of support which is heated above the eutectic may be less than one-half of the total mass of the support, and usually less than one-tenth of the total mass. Further, the mass of the portion of the support heated above the eutectic should advantageously be less than ten times the mass of the semiconductor chip. The small mass of support which is heated above the eutectic will prevent excessive heat from being absorbed by chip 4 upon alloying contact being made, and the large unheated mass of the support will act as a heat sink and aid in cooling of the alloyed junction. It is only necessary that the surface area of the portion 5 which is brought above the eutectic be slightly greater than the surface area of the chip which is to contact and alloy to the support. The total planar surface area of the support, however, will ordinarily be much greater than the surface area of the chip to be alloyed to the support. For example, the total planar surface area of the support is usually at least twice the surface area of the chip.

As a specific example, a 0.016 inch square germanium chip was held by vacuum pencil 2 as shown in FIG. 1. The tip of the gas nozzle 7 (about 0.086 inches inner diameter) was held approximately 0.125 inches from the area 5 of support 1. The support 1 was gold plated Kovar with a diameter of approximately 0.169 inch. Referring to FIG. 1, a 580° C. temperature gas stream of 90 percent nitrogen and 10 percent hydrogen was emitted from nozzle 7 at a rate of approximately 2,000 cubic centimeters per min. flow rate for approximately 4 seconds. The chip 4 was then moved through the gas stream to contact the portion 5 of support 1 as shown in FIGS. 2 and 3, with the pressure applied to the chip after contact being about 500 lbs. per square inch. The total time that the bottom surface of the chip was in the gas stream prior to contact was less than one second. Immediately upon contact, the gas stream was stopped and a cooling gas was passed through pickup 2 to aid in cooling the junction to room temperature.

Silicon chips were alloyed to a header using the same procedures as set forth in the preceding paragraph with the exception that the temperature of the heating gas was approximately 740° C.

Although the present invention has been described hereinabove and illustrated in the accompanying drawing with respect to specific embodiments, it will be appreciated that various modifications and variations may be made in the novel process described without departing from the spirit and scope of the invention.

What is claimed is:

1. A method for the eutectic alloy bonding of a thermally sensitive semiconductor body to a thermally conductive header comprising the steps of:

a. selectively and rapidly heating a portion of said header, which portion is substantially less than half of the total mass thereof, to a higher temperature than the eutectic temperature of the bonding alloy to be formed, but below the melting point of the header; and then b. contacting said semiconductor with the heated portion of said header while the unheated portion of the header remains substantially cooler than the heated portion, whereby an alloy bond is formed between the semiconductor and header, and whereby rapid cooling of the bond inherently follows due to heat conduction between the heated and unheated portions of the header.

2. The method of claim 1 in which said heated portion of said header comprises less than one-tenth of the total mass thereof.

3. The method of claim 1 wherein said heating step is carried out by means of a hot gas stream directed on said header.

4. The method of claim 1 including the step of causing a cooling medium to flow over the materials immediately after contact to cool the alloy junction.

5. The method of claim 1 wherein the header is a gold-plated ferrous alloy.

* * * * *